Patented June 28, 1938

2,122,053

UNITED STATES PATENT OFFICE 2,122,053

PROCESS OF MANUFACTURING POROUS METALLIC BODIES

Hans Burkhardt, Berlin-Lankwitz, Germany, assignor to Accumulatoren-Fabrik Aktiengesellschaft, Berlin, Germany, a joint-stock company of Germany No Drawing. Application March 11, 1936, Serial No. 68,296. In Germany January 22, 1935

4 Claims. (Cl. 75—22)

My invention relates to improvements in the process of manufacturing porous metallic bodies, and more particularly in the process in which powdered metal, mixtures of powdered metals, or mixtures of powdered metal oxides are brought into the desired shape and sintered at high temperature below melting temperature and in an inert or reducing atmosphere.

The object of the improvements is to provide a process which permits the metal powder to be moulded into various forms, and in which shrinking of the moulded body is prevented. With these objects in view my invention consists in first producing a plastic mass substantially free of pores from a powdered metal compound or compounds and suitable viscous additions, such as polyvalent alcohols, lyes, or tar distillates which are preferably free of acid, by rubbing or kneading the said components, moulding the said plastic mass and heating the moulded body in the presence of a reducing medium at a temperature such that the metal compound is reduced to metal and simultaneously sintered, while the non-metallic components of the body are in part or completely volatilized while forming pores in the body. Preferably the powdered metal compounds are used in the form of the oxides. When the moulded body is thus treated the particles of the metal compound are reduced to metal and sintered into a coherent porous body, while simultaneously the plasticity producing component is completely or in part vaporized. I have found that this plasticity producing medium does not deform or tear the moulded body and that the particles to be sintered cohere until the plasticity producing medium has been removed. The result of the process is a porous body in which the volume of the pores is as high as 80% or less of the volume of the body.

In my improved process I may use any metal compound which is adapted to be reduced below melting temperature into the said metal, such as the oxides, chlorides, nitrates, sulfates, halides, acetates, and other compounds for example of the heavy metals. The composition to be moulded and sintered may contain a single metal or a plurality of metals forming alloys. To the metal compounds other substances such as carbon, silicon, or compounds thereof may be admixed which are combined in the course of the heat treatment with the reduced metal, or which are left in the pores of the sintered body where they are desired for the future use of the said bodies.

The plasticity producing media are particularly organic substances such as oils, fats, fatty acids, and polyvalent alcohols, and also inorganic substances such as alkali lyes and solutions of waterglass. When such substances are added the mass may be more readily moulded, and, further, they take part in the formation of pores in the sintered body and therefore the character and the amount of the said substances to be added to the initial composition also depends on the desired degree of porosity of the sintered body. The more plastic binding medium is contained in the initial composition, the higher is the volume of the pores in the sintered body. Ordinarily the volume of the plasticity producing medium will be about 40% by weight or less of the metal compound.

Most metal compounds may be combined with these binding media into compositions of good plastic properties. But there are a few compounds, for example oxides which are produced or glowed at very high temperature, which may assume a more or less doughy state when they are thus treated with liquid binding media, and in this case I prefer to add suitable substances to the initial composition by means of which the said composition is made plastic. Suitable additional substances of this character are such which are adapted to adsorb the binding media, such for example as metal hydroxide and coal. Of course, any such addition has an influence on the degree of porosity of the final product, and therefore the character and volume of the said additional substances should be adapted to the desired volume of the pores.

For obtaining larger pores in the sintered body I add a substance or substances to the initial composition which is adapted to develop gas, and which produces gas inclusions within the plastic composition after the said composition has been moulded. A suitable medium is ammonium bicarbonate.

To prevent cracks in the sintered body I add suitable substances, such as charcoal, to the plastic composition which are adapted to absorb a part of the gas which is energetically developed when the moulded body is heated and which give off the said gas as heat treatment proceeds.

The metal compounds may be reduced to metal by circulating reducing gas such as hydrogen or carbon monoxide through the furnace.

But I may also use plasticity producing media or add other substances to the initial composition which have reducing action at elevated temperature, such for example as organic compounds or carbon, in which case the moulded bodies are sintered either in vacuo or in an inert atmosphere, or in a reducing atmosphere produced by the decomposition of the said substances.

When making the initial composition of the metal compound and plasticity producing medium, care should be taken that all the substances which are undesirable in the final product can be removed by subsequent treatment of the final body or decomposed or vaporized in the course of the heat treatment.

For this purpose it is preferred to use such mixtures, in which the non-metallic components react on each other at elevated temperature while forming gaseous products. For example the initial composition may be made from metal oxides and an organic plasticity producing medium such as glycerine. The glycerine which reduces the metal oxides to metal is oxidized by the oxygen of the metal oxides to water and carbonic acid. In another example of the process the components to be removed from the initial composition may be vaporized by temporarily circulating gas or vapour such as oxygen and water through the composition which are adapted to reduce volatile compounds from the said substances.

The composition may be moulded into the desired shape by any known or preferred method. For example I may mould the composition into complicated forms by hand or by means of patterns. Plates may be produced by rolling on suitable mills, and cylindrical or other bodies of even cross-section may be produced by squirting the same by means of presses, and grating and similar bodies may be produced by pressing. In some cases it may be desirable to mould the composition in several parts, in which case the moulded parts may be readily combined by pressing the same on one another. The plastic composition may also be moulded together with pieces of solid metal such as wire, strips of sheet metal etc., in which case the sintered composition sticks to the said solid metal, which solid metal provides a core or an extension of the sintered matter, and which reinforces the said sintered body or may be used as terminal for the supply of electric current or for other purposes.

Porous metal bodies which have been produced by my improved process have comparatively high strength. This is explained by the fact that the plastic initial composition permits a very fine and uniform distribution of the particles to be sintered, and that the said particles are intimately connected before sintering so that they act as a single coherent body when they are subjected to a change of volume by heat treatment.

The porous metal bodies made by my improved process may be used for many purposes. For example they may be used as filters, as moulds, as wicks, as plates for storage batteries, and catalysts.

Example 1.—100 grammes of ground hammer scale glowed at high temperature are mixed with 15 grammes of glycerine and 12 grammes of iron hydroxide and kneaded therewith into a highly plastic composition. This composition is rolled from both sides on a netting of iron wire, and the said body is heated in a furnace at 850° C. four hours while excluding air, and at this temperature during one hour. Vaporized water is circulated through the heating-chamber, whereupon the vaporized water is expelled by hydrogen, and now the temperature is raised to 900° C. and kept at this height one hour. The sintered body is cooled in a current of hydrogen. The result is a porous iron plate containing the netting of iron wire as a core.

Example 2.—100 grammes of nickel oxide are rubbed with 28 grammes of glycerine. To the mixture 10 grammes of finely powdered charcoal are added, and the mixture is kneaded into a plastic mass. From the said mass a plate is moulded, and from the said plate a grating is formed by means of a toothed roller. The heat treatment is the same as has been described with reference to Example 1. The result is a grating of porous nickel.

Should the composition have been made without the addition of charcoal the result would be under otherwise similar conditions a sintered body having cracks.

I claim:

1. The herein described process of manufacturing porous metallic bodies, which consists in mixing a powdered metal compound with any one of the substances of a group consisting of oils, fats, fatty acids, polyvalent alcohols, glycerine, alkali lyes and water glass which are non-volatile at temperatures lower than the temperatures at which the said metal compound is capable of being reduced and sintered, and a substance which is adapted to adsorb the compound of the said group, working the mixture into a plastic composition, moulding the said composition into a body substantially free of pores, and heating the said composition in the presence of a reducing medium at a temperature and during a period of time such that the metal compound is reduced to metal and partly expelling the non-metallic components.

2. The herein described process of manufacturing porous metallic bodies, which consists in mixing a powdered metal compound with any one of the substances of a group consisting of oils, fats, fatty acids, polyvalent alcohols, glycerine, alkali lyes and water glass which are non-volatile at temperatures lower than the temperatures at which the said metal compound is capable of being reduced and sintered, and a metal hydroxide which is adapted to adsorb the compound of the said group, working the mixture into a plastic composition, moulding the said composition into a body substantially free of pores, and heating the said composition in the presence of a reducing medium at a temperature and during a period of time such that the metal compound is reduced to metal and partly expelling the non-metallic components.

3. The process as claimed in claim 1, in which to the said mixture from which the body is to be moulded a substance is added which is adapted before the plastic mass has become solid to develop gas.

4. The herein described process of manufacturing porous metallic bodies, which consists in mixing a powdered metal compound with any one of the substances of a group consisting of oils, fats, fatty acids, polyvalent alcohols, glycerine, alkali lyes and water glass which are stable at temperatures lower than the temperatures at which the said metal compound is capable of being reduced and sintered, and charcoal which is adapted to absorb gas, working the mixture into a plastic composition, moulding the said composition into a body substantially free of pores, and heating the said composition in the presence of a reducing medium at a temperature and during a period of time such that the metal compound is reduced to metal and partly expelling the non-metallic components.

HANS BURKHARDT.